July 10, 1951 M. P. CHAPLIN 2,559,945
PULP MOLDING MACHINE
Filed Nov. 1, 1946 7 Sheets-Sheet 1

Fig. 1.

INVENTOR
Merle P. Chaplin

Fig. 2.

INVENTOR
Merle P. Chaplin

July 10, 1951

M. P. CHAPLIN 2,559,945

PULP MOLDING MACHINE

Filed Nov. 1, 1946

INVENTOR

Merle P. Chaplin

July 10, 1951   M. P. CHAPLIN   2,559,945
PULP MOLDING MACHINE

Filed Nov. 1, 1946   7 Sheets-Sheet 4

INVENTOR
Merle P. Chaplin

INVENTOR
Merle P. Chaplin

Patented July 10, 1951

2,559,945

UNITED STATES PATENT OFFICE 2,559,945

PULP MOLDING MACHINE

Merle P. Chaplin, South Portland, Maine, assignor to Chaplin Corporation, South Portland, Maine, a corporation of Maine Application November 1, 1946, Serial No. 707,169

9 Claims. (Cl. 92—56)

This invention has to do with a machine for manufacturing molded fibre articles. In its simplest form such a machine forms articles on dies, by vacuum or suction, from a liquid fibre mixture, said dies being specially constructed to permit the water or other liquid to be drawn through the dies under said suction or vacuum, leaving a fibre deposit on the die surface. After suction forming on said dies, the articles are removed therefrom and dried. Such a process is well known in the art.

This particular invention has to do with a novel mechanism for moving and indexing certain parts of the machine, to move them rapidly and accurately into alignment, and to hold them in alignment while certain functions are being performed.

Reference is made to the following figures.

In the machine as shown by the drawings, the dies on which the articles are formed are shown at 1, these being mounted, as a group, on a suitable structure for rotation about shaft 2. A tank 3 is provided in which the liquid pulp materials are maintained at a certain level, and the pulp materials are deposited on the dies 1 by vacuum applied through pipe 4 operating through a ported valve 5 connecting to the several dies in a manner well known in the pulp molding art. Pipe 4a also connected to ported valve 5 supplies compressed air behind dies 1 to assist in the transfer of articles to the drying die.

The wheel carrying the forming dies may be rotated in either direction, but it is preferable to rotate it in the direction of the arrow. This provides for inspection of the forming dies during rotation at Position A and for cleaning the dies by pressure showers 5a at Position B. Drying dies are mounted, as a group, on a chain conveyor 6 which is held and moved by means of a pair of sprockets 7. The articles after being transferred to the drying dies carried by the chain conveyor 6, pass through a drying oven 8. A pair of sprockets similar to 7 is mounted at the far end of the drying oven to support the opposite end of chain conveyor 6. The articles are carried through the drying oven during which time the liquid remaining in the articles is removed by rapid circulation of heated air and/or superheated steam.

The dies themselves may also be heated. The articles may be delivered in a dry condition from the far end of the oven, or they may be carried over and around the sprocket at the far end of the oven and discharged from the drying forms at some point in their return travel.

The more specific features of the invention here involved will now be discussed, namely, the method by which the forming dies and drying dies are moved into exact alignment with each other, and held in alignment while the article is being transferred from one to the other.

For simplification, the stepping and locking mechanisms are shown applied only to the sprockets which carry and support the chain conveyor on which the drying dies are mounted. It is obvious, however, that this same stepping and locking mechanisms can be applied to the wheel or drum which carries the forming dies about their central shaft 2.

This invention contemplates the application of the specific and novel form of stepping mechanism to both the forming dies and the drying dies.

Figure 6:
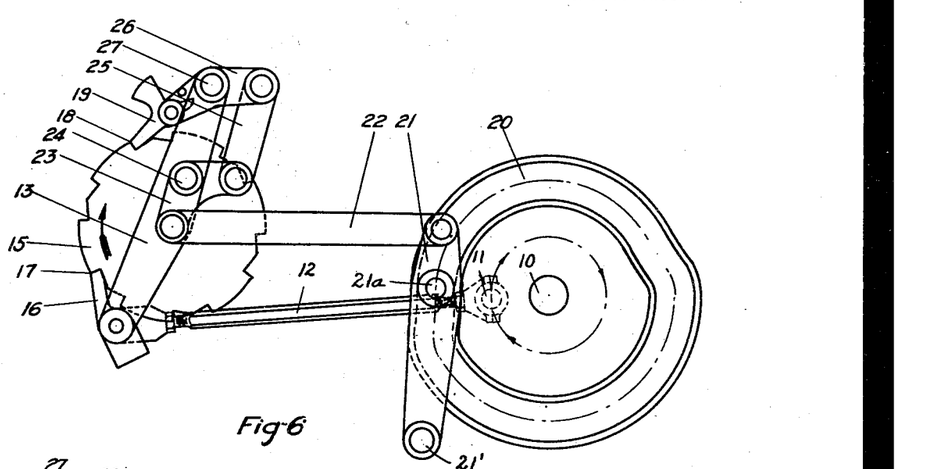
Fig. 6 shows a view of the stepping mechanism used to step or index the shaft, sprockets and drying dies into position, this particular view showing the completion of the stepping stroke.
Figure 7:
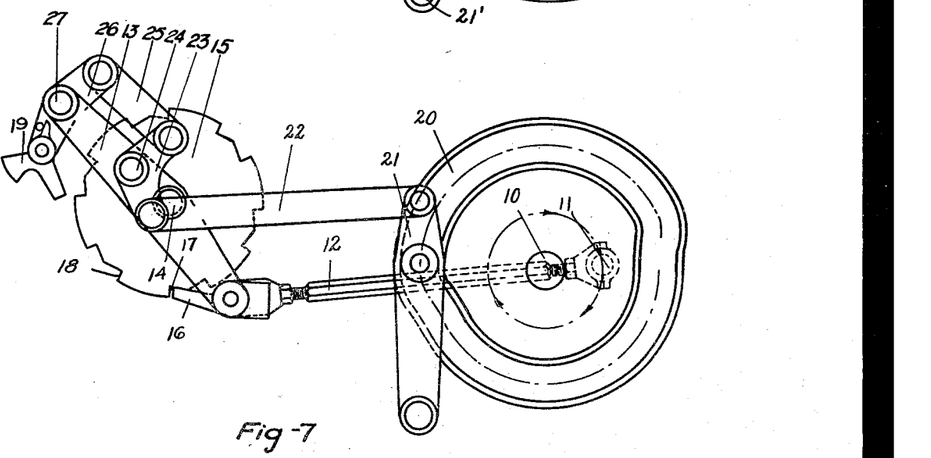
Fig. 7 is another view of the stepping mechanism showing it in a position to start the stepping stroke.

Considering the stepping and locking mechanisms in detail as applied to the drying dies reference is made to Figs. 6 and 7.

Figure 1:
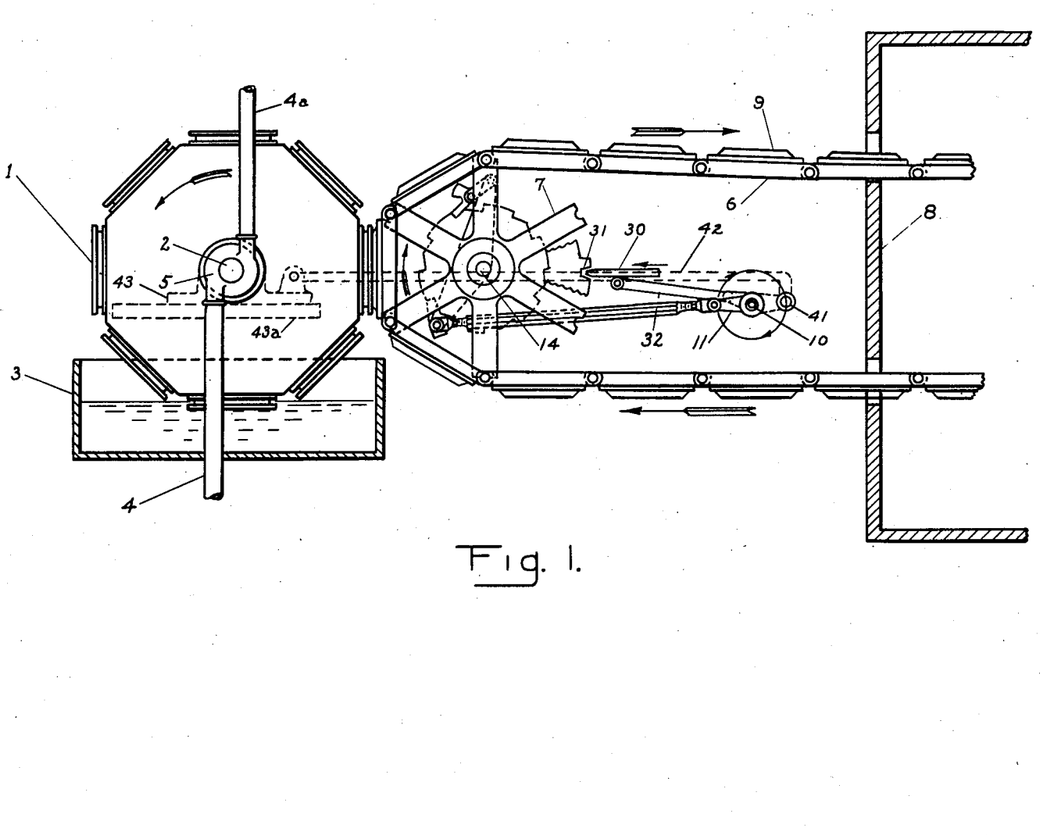
Fig. 1 is an elevation showing the forming dies and a portion of the drying die mechanism. This shows the forming dies and drying die mechanism in a position to transfer an article from the forming dies to the drying dies.
Figure 2:
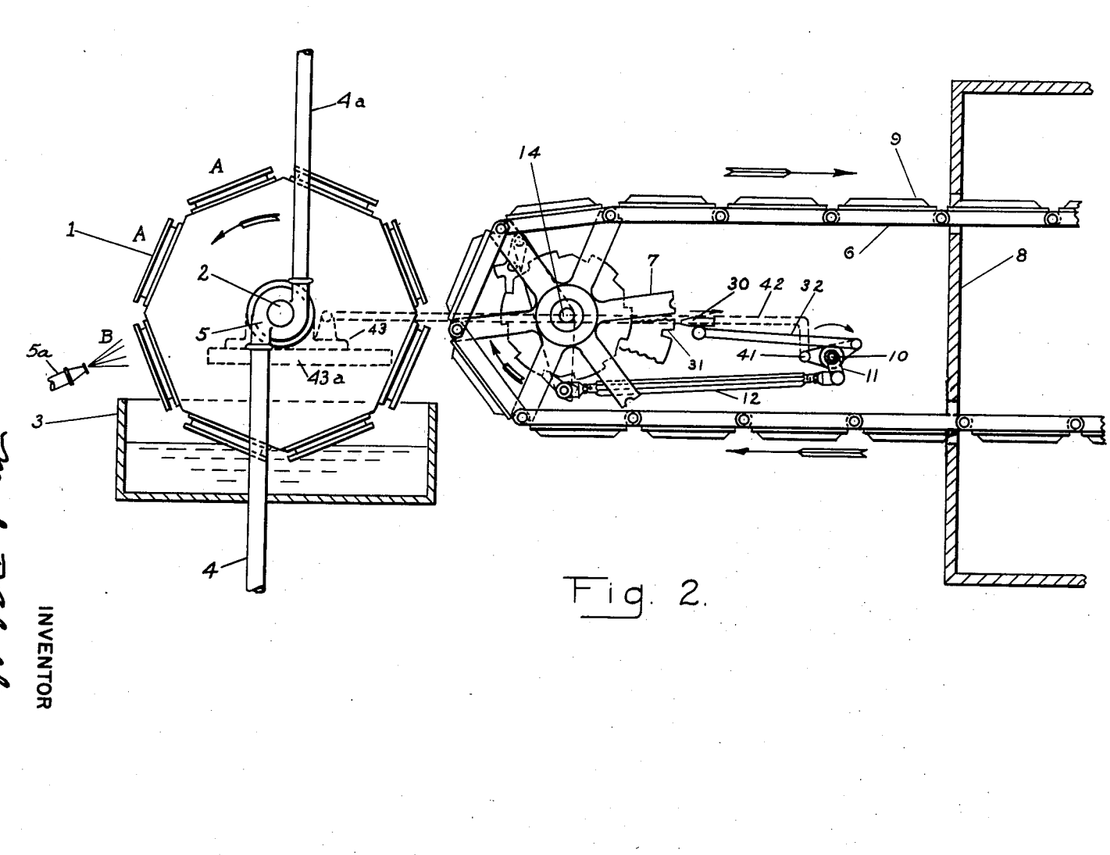
Fig. 2 is a view similar to Fig. 1 except that the forming dies and the drying dies have been separated, and are being rotated about their separate axes to bring a new forming die and a new drying die into position for transfer.
Figure 3:
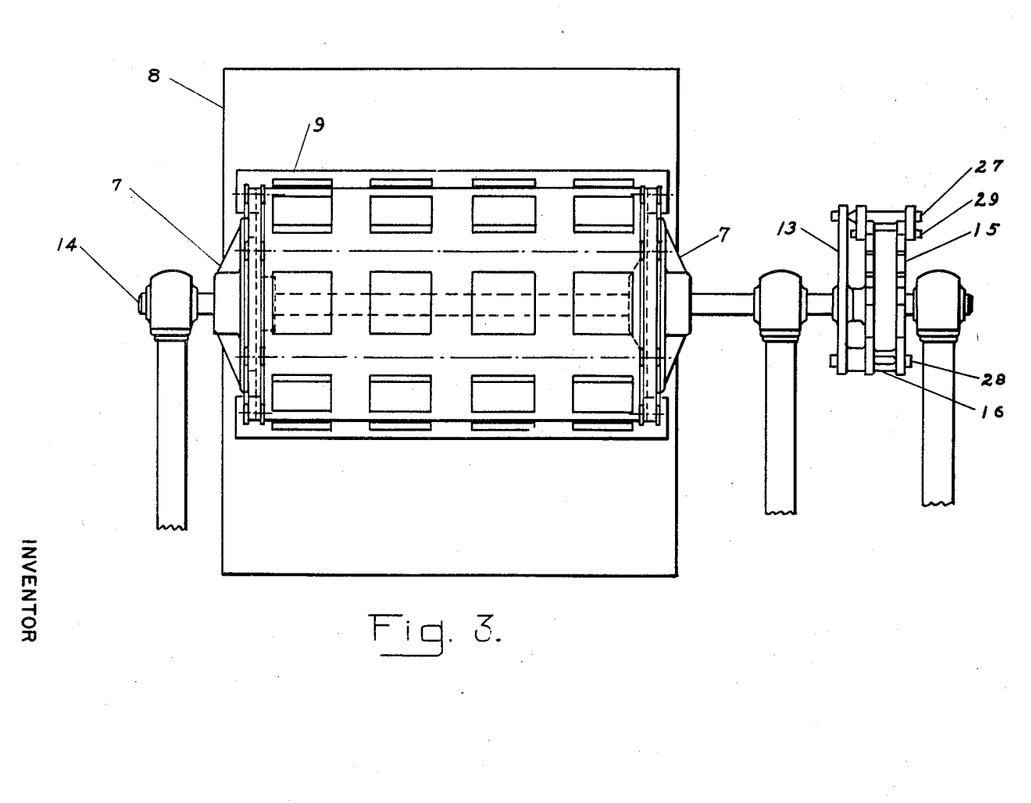
Fig. 3 is a view of the shaft which carries the drying dies showing that a number of dies may be located at each successive position, also indicating the relative location of the mechanism which steps and indexes drying dies to position. This view is an end elevation looking to the right from the left hand end of Fig. 2 with all of the forming mechanism and pulp tank removed.

Motion for rotating the sprocket shaft 14 carrying the chain conveyor on which the drying dies are mounted is derived from a continuously rotating power driven shaft 10. This can be driven from any appropriate source of power not here shown. Suitable cranks or eccentrics 41 (Fig. 1) mounted on shaft 10 serve to move the forming shaft 2 from the position shown in Fig. 1 to the position shown in Fig. 2 and return. The shaft 2 carrying the forming dies is mounted in sliding bearings 43 which are supported on a stationary base frame 43a.

The necessary motion for mechanically moving the sprockets, chain conveyor, and drying dies into position is derived from a crank 11 mounted on and rotating with power driven shaft 10. This crank is connected by an adjustable connecting rod 12 to an arm 13 mounted for oscillation about the axis of the sprocket shaft 14 on which the stepping wheel 15 is mounted, and which wheel is fixed to the shaft 14 thereby rotating the shaft 14 and the sprockets 7, carrying with them the chain conveyor 6.

Mounted on one end of the arm 13 is a stepping pawl 16 which engages teeth cut in the stepping wheel 15 as shown. Two sets of teeth are provided. One set is indicated at 17 as stepping teeth while the other set faces in the opposite direction and are indicated at 18 as locking teeth.

Mounted on the opposite end of arm 13 is a locking pawl 19, mounted in a manner as will be hereafter described in more detail. The opposing teeth 17 and 18 are engaged between pawls 16 and 19 so that any motion of the arm 13 about the shaft 14 rotates said shaft 14 in exact accord with the motion of arm 13 about the shaft axis.

For moving the locking pawl 19 into locking position, a series of levers are operated by means of cam 20 mounted on and rotating with shaft 10 or the same shaft which carries the crank 11.

Cam 20, through cam follower 21a, lever 21 and link 22 operates a bell crank 23 mounted on a fulcrum pin 24 secured to arm 13. This bell crank 23 is connected by a link 25 to another bell crank 26 on one end of which the pawl 19 is mounted. Lever 21 is fulcrumed on pin 21' carried by the frame of the machine. The effect of this mounting is to provide a toggle action by a combination of the motion and positions of bell crank 26 and pawl 19. Bell crank 26 is mounted for rotation about a fulcrum pin 27 on arm 13.

Figure 8:
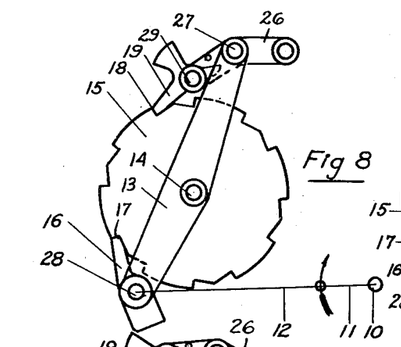
Fig. 8 is a simplified view of the stepping mechanism showing it in substantially the same position as is shown in Fig. 6 or the completion of the stepping stroke.

Referring to Figs. 8 to 17 inclusive:

Fig. 8 shows the stepping mechanism at a position where it has just completed a step stroke, and the crank 11 is in a direct line between shaft 10 and the fulcrum pin 28 of the stepping pawl 16.

At this same time the locking pawl 19 pivoted to bell crank 26 at pivot pin 29 is in a substantially straight line between the fulcrum pin 27, the pivot pin 29 and the locking tooth 18 on stepping wheel 15. At this time there is no motion of the arm 13 about the shaft 14 and consequently no rotary motion of the wheel 15 and no motion of the sprockets, chain conveyor and drying dies. The stepping wheel 15 is held locked to the arm 13 by the two opposing pawls 16 and 19, and the arm 13 being directly connected by rod 12 to crank 11, means that the position of stepping wheel 15 is fixed and pre-determined at this point.

The stepping mechanism must now be returned to its starting position and to a point where it will engage another stepping tooth 17 on stepping wheel 15. Before the arm 13 can be moved backward to the start of a new stepping stroke, or from the position shown in Fig. 6 to the position shown in Fig. 7, the locking pawl 19 must be disengaged from the tooth 18 on stepping wheel 15. To do this the lever 21 operated by cam 20 rotates the bell crank 26 by means of the links and bell cranks already described, about its fulcrum pin 27 first to the position indicated in Fig. 9, then to the position indicated in Fig. 10.

Figure 9:
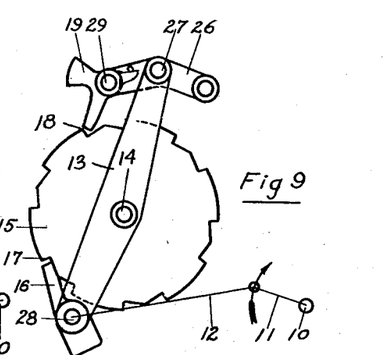
Fig. 9 shows the same mechanism about to start its return stroke.

It is obvious of course that in order to impart motion to the bell crank 26 through the lever 21 and cam 20, there must be some rotation of the shaft 10 and the crank 11. Also that any movement of crank 11 also imparts movement to the arm 13 and to the fulcrum pin 27 on which the bell crank 26 is mounted and which in turn carries the pawl 19. However, due to the toggle action between the bell crank 26 and the pawl 19, pawl 19 is moved backward relative to stepping wheel 15 and tooth 18 more rapidly than the motion of the arm 13 in the opposite direction. The initial motion therefore imparted to the pawl 19 is to provide a clearance between the end of pawl 19 and the tooth 18 as shown in Fig. 9 and a further motion of the bell crank 26 and pawl 19 under operation and control of cam 20 lifts pawl 19 entirely clear of tooth 18 and stepping wheel 15 as indicated in Fig. 10.

Figures 10, 11, 12, 13:
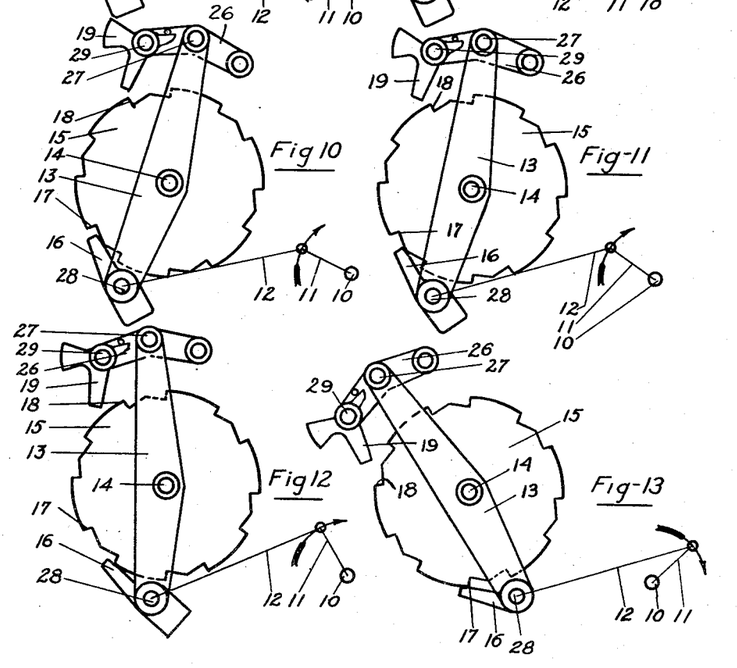
Fig. 10 shows the same mechanism a little more advanced in its return stroke.
Fig. 11 shows the return stroke about one-quarter completed.
Fig. 12 shows the return stroke approximately one-half completed.
Fig. 13 shows the return stroke almost completed.
Figures 14, 15:
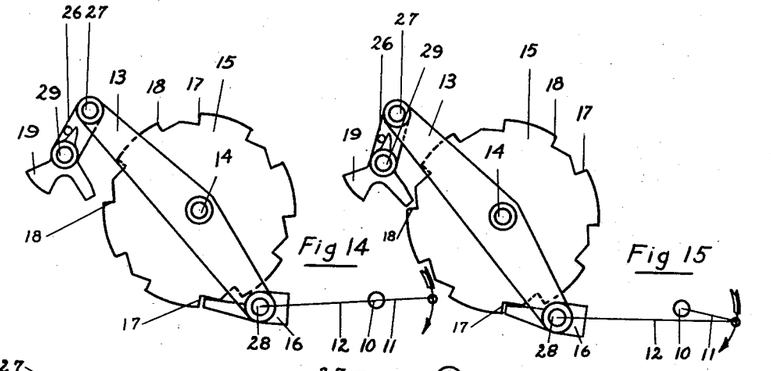
Fig. 14 shows the return stroke entirely completed and corresponds in position to that shown in Fig. 7.
Fig 15 shows the start of the stepping stroke but not sufficiently advanced so that it has begun to step or turn the sprocket carrying the drying dies.

The arm 13 is then free to move backward through the successive steps shown in Figs. 11, 12, and 13 to a position shown in Fig. 14 where the pawl 16 is in a position to re-engage another stepping tooth 17.

A small clearance is provided between the end of the stepping pawl 16 and tooth 17 as indicated in Fig. 14, and as the shaft 10 and crank 11 continue their movement past the center point indicated in Fig. 14, and start a stepping stroke as indicated in Fig. 15, the cam 20 through the mechanism already described, reverses the operation of bell crank 26 and pawl 19 to re-engage it in a new tooth 18 as indicated in Fig. 15.

At this point the pawl 19 has entered the tooth 18 but the toggle action has not been completed to straighten out the line between fulcrum pin 27 and pivot pin 29 which occurs just at the time when the crank 11 has advanced the arm 13 and the pawl 16 to engage a new stepping tooth 17. At this time the cam mechanism has straightened out the toggle action as shown in Fig. 16 so that the stepping wheel 15 is again locked for controlled motion under the control of the crank 11.

Figures 16, 17:
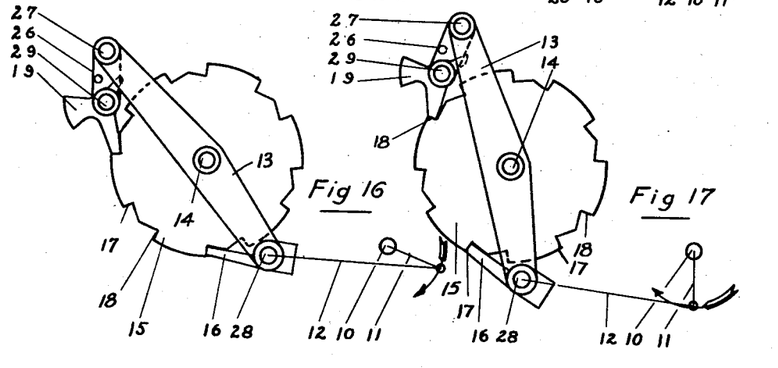
Fig. 16 shows the stepping stroke slightly more advanced and in a position to start rotation of the sprocket and movement of the drying dies.
Fig. 17 shows the stepping stroke about half completed.

Fig. 17 shows the stepping motion partially completed with the stepping wheel 15 locked between the pawls 16 and 19 and the motion of the stepping wheel, the sprockets, the chain conveyor and the drying dies absolutely under control of the crank 11 mounted on shaft 10. The motion of the crank mechanism and stepping wheel continues until it arrives at the position shown in Fig. 6 or has completed a new stepping or motion stroke.

Figures 4, 5:
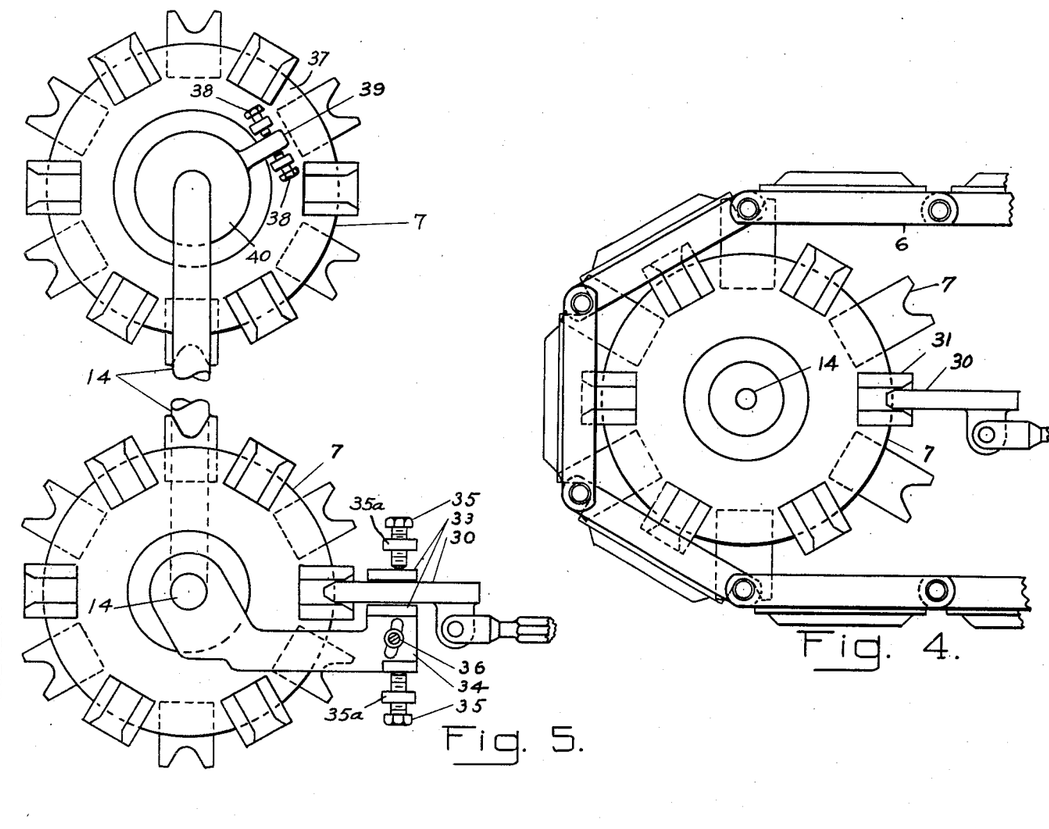
Fig. 4 shows the construction of the sprocket which carries the chain on which the drying dies are mounted, and also the locking mechanism which meters and holds them in position during the return stroke of the stepping mechanism.
Fig. 5 is an elevation of the indexing mechanism shown in a diagrammatic way to illustrate how the sprockets at the opposite sides of the machine may be circumferentially adjusted relative to one another and locked in successive positions.

During the return or back stroke of the stepping mechanism the sprockets 7 are held locked in position by means of a locking bar 30 shown in Fig. 4 which is brought into engagement with a locking slot 31 mounted on one of the sprockets 7. This locking bar 30 is brought into engagement with the locking slot 31 immediately on the completion of the stepping stroke or the position indicated in Fig. 6. The locking bar is pivotally connected to and operated by a crank or eccentric 32, mounted on power driven shaft 10. The sprockets, chain conveyor, and drying dies are therefore held locked in stationary position during the entire return stroke of the stepping mechanism and as soon as the stepping mechanism has arrived at a position shown generally in Fig. 7, the locking bar 30 is withdrawn from its locking slot 31 thereby permitting stepping mechanism to rotate the stepping wheel, sprockets, and chain conveyor into a successive or new position.

Mention has already been made of an adjustable connecting rod 12 between the crank 11 and the fulcrum pin 28 of pawl 16. The object of this adjustable connecting rod is to change the position of the stepping wheel 15 at the end of the stepping stroke or the position shown in Fig. 6, this adjustment being necessary in order to bring the drying dies 9 into exact alignment with the forming dies 1 at the time of transfer of the formed articles from the forming dies to the drying dies.

In order that the locking bar 30 may be brought into exact alinement with the locking slot 31, said bar is mounted on an arm 34 pivotally supported on the shaft 14. This arm carries guides 33 between which the locking bar is supported for reciprocating movement. The arm may be pivotally adjusted about the axis of shaft 14 by regulating adjusting screws 35 which are threaded through lugs 35a rigid with the frame of the machine. A clamp bolt 36 passing through said frame and through a slot in the arm 34 may be tightened to clamp the arm in adjusted position.

It has already been pointed out that the shaft 14 is moved into exact rotative position under control of crank 11 and when moved into exact rotative position it is held in this exact position by means of locking bar 30, this bar holding the shaft, together with the sprockets, chain conveyor, and drying dies stationary during the return motion of the stepping mechanism.

To provide for an exact alignment of the sprocket teeth on the two sprockets carrying the chain conveyor and drying dies, an adjustment is provided between the hub 40 and the outboard sprocket 37 by means of two set screws 38 mounted on the sprocket 37 and acting on a lug 39 mounted on the hub 40 which is fixed to shaft 14.

It is therefore seen that an accurate and positive and novel indexing mechanism is provided for moving the drying dies into exact operative position to receive an article from the forming dies, means are provided for holding these dies in exact position during the return stroke of the stepping mechanism which moved these dies into exact position, and means for aligning the two sprockets which carry the chain conveyor on which the drying dies are supported.

The wheel mounted on shaft 2 on which the forming dies 1 are carried is moved back and forth on sliding bearings 43 by means of cranks 41 and connecting rod 42. These cranks 41 are mounted on the continuously rotating power shaft 10 so that the motion of the forming dies 1 to and from the drying dies 9 is maintained in exact synchronism with the stepping mechanism as all motions are derived from a single power driven shaft.

It is vitally necessary in the formation of molded fibre products that the co-acting dies be accurately aligned and controlled in their co-operative relation with each other during the transfer of the freshly formed and still wet article from one die to the other. While the stepping mechanism heretofore described and illustrated is shown in connection with the motion of the drying dies, it is equally obvious that it can be applied to the rotary motion of the forming dies. It therefore follows that it is possible to move the forming dies and the drying dies into exact and accurate alignment with each other by means of a constantly rotating power driven shaft and suitable and novel mechanism heretofore described.

It will therefore be seen that I have provided a mechanism for operating a pulp molding machine by which articles are formed by suction on forming dies, are transferred from forming dies to drying dies, the mechanism of this invention insuring that accurate and positive co-operation of the forming and drying dies is secured at all times. Also that all of the operating mechanism is under the control and operated by a single power driven shaft insuring continuous accurate timing and relationship of the cooperating parts. Certain essential adjustment features are also provided.

What I claim is:

1. In a machine for making molded fibre articles wherein groups of forming and drying dies are respectively mounted for rotation about spaced apart axes to bring the respective forming and drying dies into alinement with one another and wherein said dies are thereupon moved into mating relation, the improvement which comprises: a stepping wheel rotatable with one group of said dies, said stepping wheel having two oppositely disposed sets of teeth, a stepping pawl coacting with one set of said teeth and a locking pawl coacting with the other set of teeth, a crank for bodily oscillating both pawls jointly back and forth coaxially of the stepping wheel to cause the stepping pawl to successively engage during successive strokes with the corresponding teeth to impart step by step rotation of the stepping wheel, a cam rotatable in timed relation to the crank, and link and lever connections between said cam and the locking pawl to engage said locking pawl with the corresponding teeth of the stepping wheel while the stepping pawl is likewise engaged and to disengage the locking pawl from such teeth during the back stroke of the stepping pawl.

2. In a machine for making molded fibre articles wherein groups of forming and drying dies are respectively mounted for rotation about spaced apart axes to bring the respective forming and drying dies into alinement with one another and wherein said dies are thereupon moved into mating relation, the improvement which comprises: a stepping wheel rotatable with one group of said dies, said stepping wheel having two oppositely disposed sets of teeth, a stepping pawl coacting with one set of said teeth and a locking pawl coacting with the other set of teeth, a crank for bodily oscillating both pawls jointly back and forth coaxially of the stepping wheel to cause the stepping pawl to successively engage during successive strokes with the corresponding teeth to impart step by step rotation of the stepping wheel, a cam rotatable in timed relation to the crank, a lever having a follower coacting with said cam, a link operated by said lever and connected to a bell crank having a link and lever connection with the locking pawl to cause the locking pawl to engage with the corresponding teeth of the stepping wheel while the stepping pawl is likewise engaged and to disengage the locking pawl from such teeth during the back stroke of the stepping pawl.

3. In a machine for making pulp articles wherein dies are movable on a carrier about a predetermined axis, the improvement which comprises: a stepping wheel mounted coaxially of and rotatable with said dies, said stepping wheel having stepping teeth all disposed in the same circumferential direction about the stepping wheel and interposed locking teeth all disposed in the opposite circumferential direction on the stepping wheel, an arm mounted intermediate its ends for oscillation coaxially of the stepping wheel, a driving pawl carried by one end of said arm to cooperate with the stepping teeth of the stepping wheel to advance said wheel step by step as the arm is oscillated, a locking pawl carried by the other end of said arm and adapted to successively engage with the locking teeth of the stepping wheel, means to engage the locking pawl with a locking tooth while the stepping pawl is engaged with a stepping tooth to preclude back lash and to disengage the locking pawl from such locking tooth when the stepping pawl is disengaged from the stepping tooth.

4. In a machine for making molded pulp articles having a forming die movable step by step into predetermined positions about an axis with a drying die mounted to be similarly moved about a separate axis step by step into predetermined positions, the improvement which comprises: a stepping wheel for driving at least one of said dies and having a set of stepping teeth facing in one direction and a set of locking teeth facing in the opposite direction, stepping and locking pawls respectively operable upon said stepping and locking teeth, means for supporting said pawls for simultaneous bodily oscillation coaxially of the stepping wheel, a power driven member, connections between said member and the pawl supporting means to so bodily oscillate said pawls, and additional connections between the power driven member and the locking pawl to withdraw it from engagement with the locking teeth during retrograde movement of the stepping pawl.

5. In a machine for making molded pulp articles having forming dies and drying dies mounted to rotate about separate shafts, a stepping wheel secured to and rotating with each of said shafts and having a set of stepping teeth facing in one direction and locking teeth facing in the opposite direction, an arm pivoted intermediate its ends for oscillation about the axis of the shaft which carries the stepping wheel, a constantly operating power driven shaft with a crank thereon, a link connecting said crank to said arm to oscillate the arm about its shaft axis, stepping and locking pawls carried by said arm and respectively engageable with the stepping and locking teeth of the stepping wheel, and means for engaging the stepping and locking pawls with the stepping and locking teeth of the stepping wheel to lock the stepping wheel to the arm against relative rotation between them during the stepping stroke of the stepping pawl.

6. In a machine for making pulp articles wherein forming dies and drying dies are mounted for rotation about different shafts, the improvement in the driving means of each of said shafts comprising: a stepping wheel mounted on the shaft and having opposed stepping and locking teeth, an arm mounted for oscillation coaxially of the shaft, a continuously rotating crank connected to the arm for oscillating the latter, a stepping pawl carried by the arm and operable against the stepping teeth of the stepping wheel, and a locking pawl also carried by the arm and operable against the locking teeth of said stepping wheel, said crank serving to oscillate said arm in a forward direction to step the stepping wheel through the stepping pawl, and additional means for engaging the locking pawl with the locking tooth while the stepping pawl is in engagement with the stepping teeth, said latter means being also effective to disengage the locking pawl from the locking tooth during retrograde oscillation of said arm.

7. In a machine for making molded pulp articles wherein forming and drying dies are mounted for rotation about the axes of their individual shafts, the improvement in the means for driving at least one of said shafts which comprises: a continuously rotating power driven shaft having a crank, a stepping wheel fixed on another shaft and having stepping and locking teeth respectively facing in opposite directions, an arm supported for free coaxial oscillation on the latter shaft adjacent the stepping wheel, a connecting link between said arm and crank for oscillating the former from the latter, opposed stepping and locking pawls carried by the opposite ends of said arm and respectively cooperating with the stepping and locking teeth of the stepping wheel, and means to engage both the stepping and locking pawls with stepping and locking teeth of the stepping wheel during oscillation of the arm in one direction and to disengage the locking pawl from the locking teeth during oscillation of said arm in the opposite direction.

8. In a machine for making molded pulp articles wherein forming and drying dies are mounted for rotation about the axes of their individual shafts, the improvement in the means for driving at least one of said shafts which comprises: a continuously rotating power driven shaft having a crank, a stepping wheel fixed on another shaft and having stepping and locking teeth respectively facing in opposite directions, an arm adapted for free coaxial oscillation on the latter shaft adjacent the stepping wheel, a connecting link between said arm and crank for oscillating the former from the latter, opposed stepping and locking pawls carried by said arm and respectively cooperating with the stepping and locking teeth of the stepping wheel, means to engage both the stepping and locking pawls with stepping and locking teeth of the stepping wheel during oscillation of the arm in one direction and to disengage the locking pawl from the locking teeth during oscillation of said arm in the opposite direction, a slotted wheel rotatable with said latter shaft, a locking bar cooperable with said slotted wheel, and operative connections between the locking bar and the power driven shaft for engaging said bar with the slotted wheel when the corresponding dies are in predetermined positions.

9. A machine for making molded pulp articles comprising: a plurality of forming dies mounted for step by step rotation about a common axis, a plurality of drying dies successively linked to one another to form a drying conveyor, a sprocket rotatable on a shaft parallel to the axis of the forming dies and about which said conveyor is passed, a stepping wheel coaxial and rotatable with said sprocket, said stepping wheel having two oppositely disposed sets of teeth, a stepping pawl coacting with one set of said teeth and a locking pawl coacting with the other set of teeth, a crank for bodily oscillating both pawls jointly back and forth coaxially of the sprocket to cause the stepping pawl to successively engage during successive stepping strokes with the corresponding teeth to impart step by step rotation to the sprocket, a cam rotatable in timed relation to the crank, link and lever connections between said cam and the locking pawl to engage said pawl with the corresponding teeth of the stepping wheel while the stepping pawl is likewise engaged and to disengage the locking pawl from the teeth during the back stroke of the stepping pawl.

MERLE P. CHAPLIN.

REFERENCES CITED

The following references are of record in the file of this patent:

UNITED STATES PATENTS

| Number | Name | Date |
|---|---|---|
| 646,287 | Hundhausen | Mar. 27, 1900 |
| 798,833 | Ruff | Sept. 5, 1905 |
| 1,218,001 | Rodwell | Mar. 6, 1917 |
| 1,492,668 | Bond | May 6, 1924 |
| 1,940,230 | Richter | Dec. 19, 1933 |
| 1,946,437 | Chaplin | Feb. 6, 1934 |
| 2,017,017 | Randall | Oct. 8, 1935 |
| 2,183,869 | Randall et al. | Dec. 19, 1939 |
| 2,307,022 | Chaplin | Jan. 5, 1943 |